Aug. 6, 1963     R. B. HOBSON, JR     3,100,190
PRESSURE FILTER AND FILTER TUBE THEREFOR
Filed Feb. 1, 1961     4 Sheets-Sheet 1
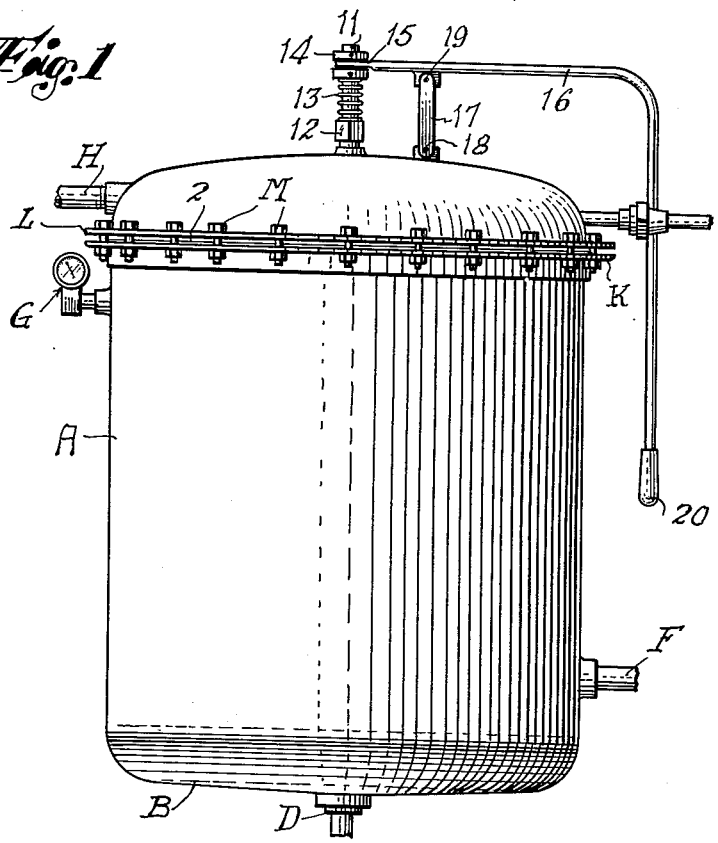
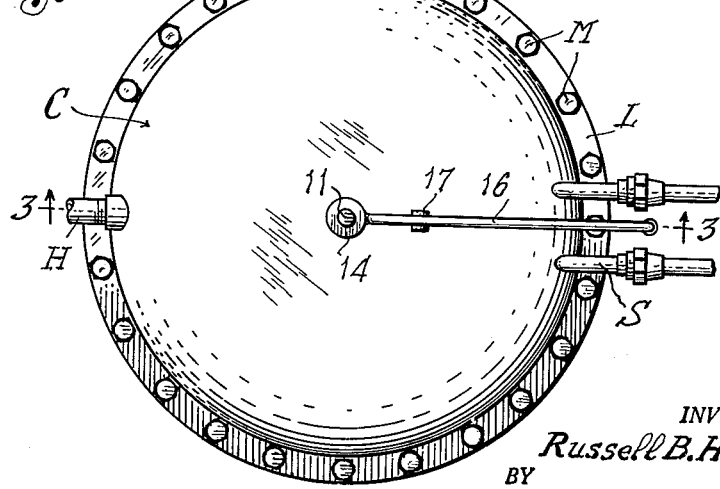
INVENTOR.
Russell B. Hobson, Jr.
BY Harry B. Rook,
ATTORNEY

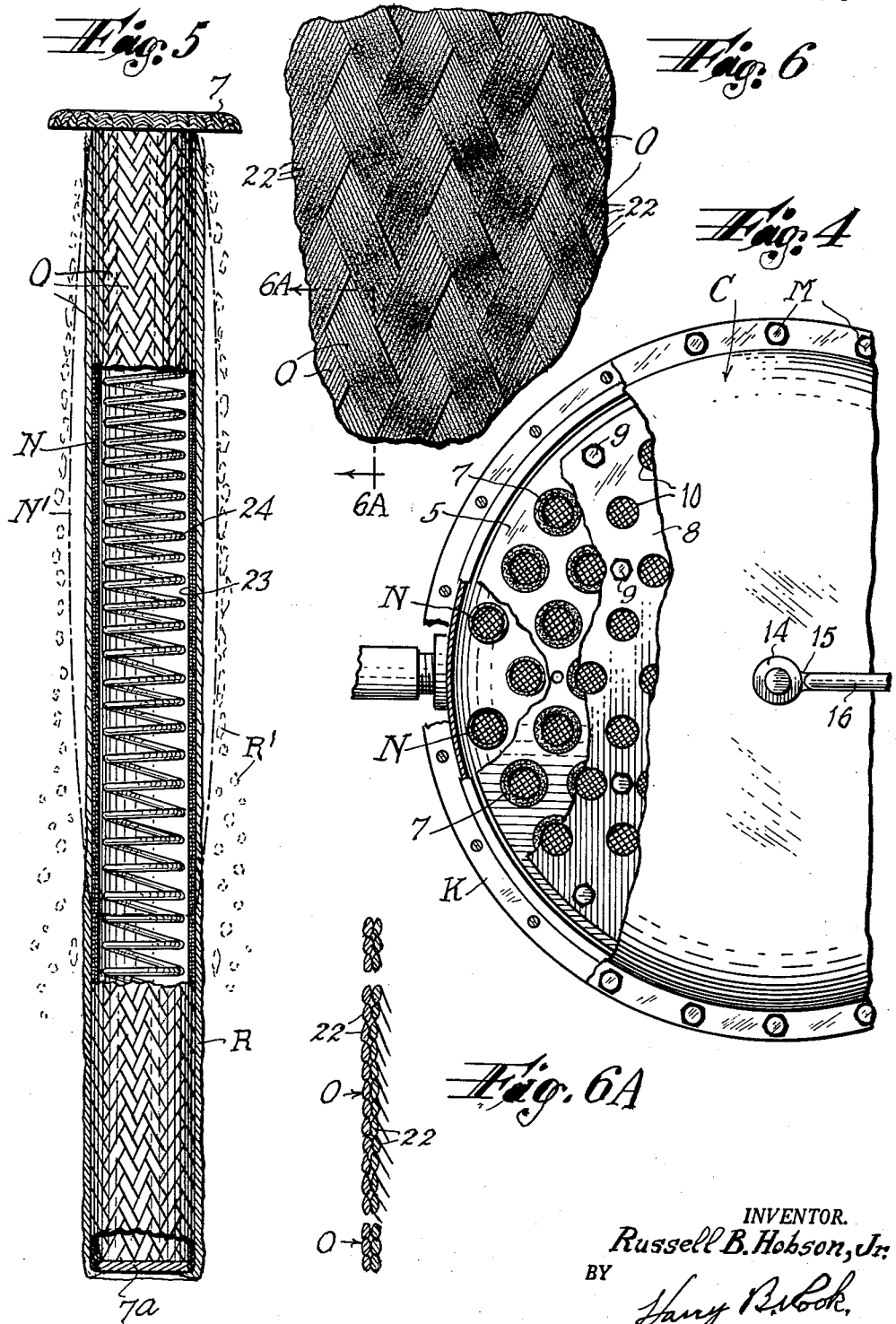

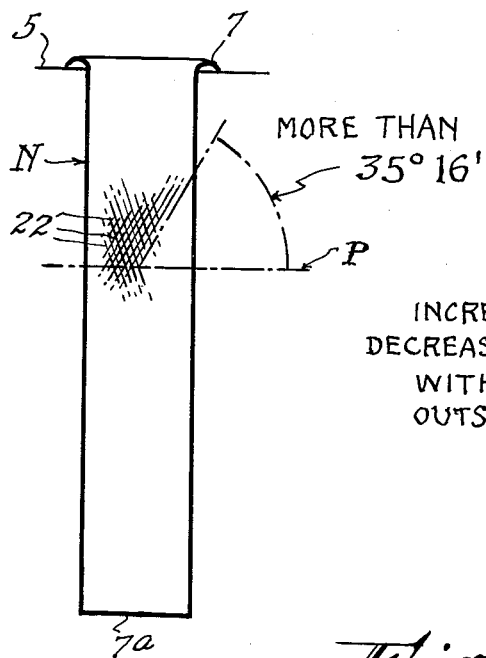
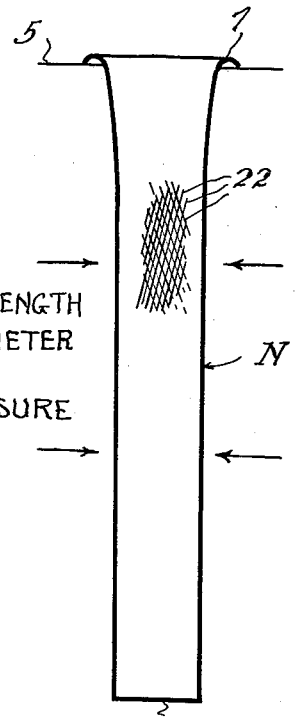
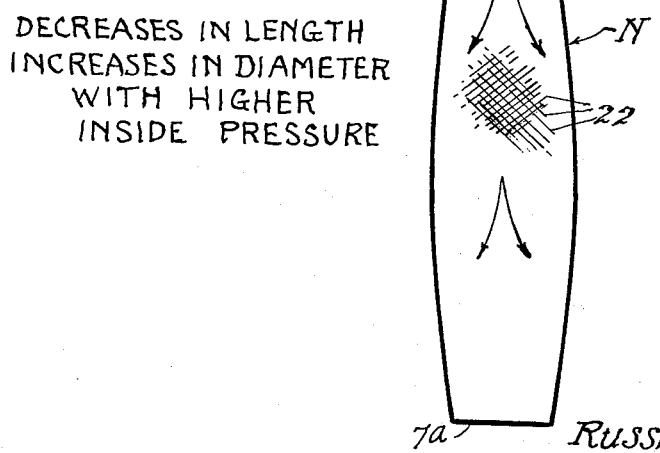

United States Patent Office 3,100,190
Patented Aug. 6, 1963

3,100,190
PRESSURE FILTER AND FILTER TUBE
THEREFOR
Russell B. Hobson, Jr., Montclair, N.J., assignor to Per Corporation, West Orange, N.J., a corporation of New Jersey
Filed Feb. 1, 1961, Ser. No. 86,447
7 Claims. (Cl. 210—106)

This invention relates in general to filters of the pressure type wherein a pressure differential in the liquid being filtered is maintained at opposite sides of a filtering element, and especially to filters that include filter elements in the form of porous or finely perforated tubes, that are used in the recovery of solvents that have been utilized for dry cleaning garments and the like. In the operation of such filters, the solvent containing a fine powder, generally a diatomaceous earth, in suspension is forced through the porous filter tubes and the powder accumulates on the surfaces of the tubes so as to reduce the size of the interstices or perforations in the tube wall and thus enhance the filtering operation and insure the removal from the solvent of the lint and dirt picked up by the solvent during dry-cleaning operations; but it is necessary periodically to remove the accumulated powders from the filter tubes to prevent clogging of the tubes.

The tubes usually comprise one or more layers of fine mesh wire screen mounted on rigid supports such as wire frames and often the diatomaceous earth powder or the like accumulates and builds up in the spaces between the tubes. The removal of the accumulated layer of powder or sludge, as it is sometimes called, is usually effected by a so-called backwash operation, that is, liquid is forced through the tubes in the direction opposite to that in which the solvent flowed during the filtering operation. It has been extremely difficult, and sometimes impossible, to completely remove the accumulated layer of powder from the tubes, and too often the sludge builds up or "bridges" in the spaces between the tubes which seriously interferes with the removal of the sludge from the filter. Sometimes means has been provided for mechanically vigorously shaking or tapping the tubes, but this operation not only fails to accomplish a satisfactory removal of the layer of diatomaceous earth, but also frequently results in damage to the tubes, for example, cracking or puncturing thereof.

A primary object of the present invention is to provide a filter of the character described which shall include a novel construction and combination of a casing, filter tubes and a support sheet therefor wherein the layers of powder can be easily and quickly dislodged or removed from the filter tubes without the possibility of damage that is incident to the heretofore known practice of shaking, knocking or tapping the tubes.

Another object is to provide a filter tube embodying a novel construction whereby portions of the wall of the tube on which the layer of powder accumulates shall be capable of relative movement under the pressure of the backwash liquid so as to dislodge the accumulated layer of powder.

A further object of the invention is to provide such a filter tube which shall be so constructed that its wall will both expand or contract in diameter and decrease and increase in length, upon application of the backwash liquid under pressure to the wall of the tube, and thereby cause dislodgement or dropping off of the powder layer from the tube.

Still another object of the invention is to provide a novel and improved construction and combination of a casing, tube-supporting sheet, a plurality of flexible filter tubes rigidly mounted at one end in said tube sheet, and means for mounting the tube sheet and the tubes in the casing for movement as a unit relatively to the casing and the solvent liquid therein so as to cause a swaying frictional contact of the tubes with the solvent liquid and thereby facilitate the dislodgement of the "filter aid" powder from the tubes.

Other objects of the invention are to provide a filter tube of this character having its walls formed of a plurality of groups of wires of small diameter, for example, .008 inch, interlaced or braided so that the wires of one group are disposed in angular or criss-cross relation to the wires of other groups and thus provide minute interstices between the crossed wires through which the liquid being filtered and the backwash liquid may flow but which will prevent the passage therethrough of the "filter aid" powder or diatomaceous earth; and to obtain other advantages and results that will be brought out by the following description in conjunction with the accompanying drawings in which FIGURE 1 is a side elevation of a pressure filter embodying the invention;

FIGURE 2 is a top plane view thereof;

FIGURE 3 is an enlarged central vertical sectional view approximately on the plane of the line 3—3 of FIGURE 2, with portions shown in elevation;

FIGURE 4 is an enlarged fragmentary top plan view of the filter with portions broken away for clearness in illustration;

FIGURE 5 is an enlarged schematic side elevation of one of the filter tubes detached from the tube sheet, with a layer of the powder thereon and illustrating in broken lines one manner of dislodging the powder from the tube;

FIGURE 6 is a greatly enlarged fragmentary side elevation of a portion of the filter tube showing the manner of braiding the wires;

FIGURE 6A is a fragmentary vertical sectional view on an enlarged scale taken on the plane of the line 6A—6A of FIGURE 6 and showing in more detail the lay of the wires;

FIGURE 7 is a schematic sectional view of a filter tube embodying the invention showing it in its normal condition with no pressure thereon;

FIGURE 8 is a similar view showing the tube increased in length and decreased in diameter as a result of a pressure differential on the wall of the tube with the higher pressure external of the tube; and FIGURE 9 is a view like FIGURE 8 showing the length of the tube decreased and the diameter of the tube between its ends increased as a result of application of a pressure differential on the walls of the tube with the higher pressure inside the tube.

Specifically describing the illustrated embodiment of the invention, the filter comprises a tank or container which includes a side wall A that is preferably cylindrical, a bottom wall B at one end of the side wall and a removable dome shaped cover C at the other end of the side wall and coaxial therewith. The side wall A and bottom wall B form the body portion of the tank that has a drain pipe D and discharge valve E in its bottom and an inlet pipe F for liquid to be filtered connected to the side wall near the bottom of the tank. Adjacent to the upper end of the tank is connected a pressure gauge G. An outlet pipe H for the filtered liquid is connected to the cover C.

Means is provided for separably connecting the cover C to the body portion of the tank and for clamping a tube sheet assembly I in fluid-tight relation to the cover and body portion of the tank. As shown, an angular flange K is rigidly and firmly secured to the exterior of the side wall A closely adjacent to the edge thereof and the cover has a flange L in the form of a ring welded to the cover. The flange K may constitute an ordinary angle bar bent into annular form and welded to the side wall A with one flange projecting from said side wall in a plane perpendicular to the axis of the side wall and parallel to the flange L of the cover. Each of the flanges has the same number of openings such that when the flanges are brought into juxtaposed parallel relation as shown in the drawings, each opening of one flange is in register with an opening in the other flange to receive the shank of a bolt M for fastening the cover on the side wall.

The tube sheet assembly includes a short tube 1 that has an exterior circumferential flange 2 clamped between opposite sides of which and the corresponding flanges K and L are packing rings 3. The tube also has a plurality of spaced inwardly projecting lugs 4 on which separably rest the edge portions of a tube sheet 5 which has a plurality of holes therethrough in each of which is fitted a filter tube N at one end of which is a flange 7 that is clamped between the upper side of the tube sheet and a hold-down plate 8 which is in turn secured to the tube sheet by cap screws 9 and clamps between itself and the tube sheet a gasket ring 5a. The hold-down plate has a plurality of openings 10 each to register with one of the filter tubes.

For the purpose of moving the tube sheet and the tubes up and down or in a direction longitudinal of the tubes, as shown in FIGURE 3, the tube sheet has connected thereto a slide rod 11 which is slidably mounted in a bearing 12 in the cover and has connected thereto a grooved collar 14 with which coacts the forked end 15 of an actuating lever 16 which is pivotally mounted on the cover by a link 17 which has its ends pivotally connected to the cover and to the actuating lever as indicated at 18 and 19, respectively. The lever 16 extends along one side of the side wall into a convenient position for manual manipulation and has a hand grip 20 on the end thereof. With this construction it will be observed that by swinging the lever 16 about its pivotal connections 17, 19, the tube sheet may be moved up and down in the tank.

Preferably a compression spring 13 is interposed between the collar 14 and the bearing 12 so as to normally approximately balance the weight of the filter tubes and tube sheet assembly so that upon influx of liquid under pressure into the tank during the filtering operation the assembly can be easily forced upwardly until the gasket ring 5a engages the inner edge portion of the plate L to insure flow of liquid through the outlet H only by way of the filter tubes.

It will be understood by those skilled in the art that in the operation of the filter, the solvent to be filtered, which has had the "filter aid" or diatomaceous earth added thereto, is forced into the tank A through the inlet F. The liquid passes through the interstices or minute openings in the side wall of the tubes, through the tubes and out the outlet H at the top of the tank. The "filter aid" gradually accumulates on the outer surfaces of the tubes so as to reduce the size of the filtering interstices and thus enhance the quality of the filtering operation, said layer being designated R in FIGURE 5 of the drawings. As hereinbefore indicated, periodically it is necessary to remove this layer of diatomaceous earth or the like. This operation usually includes a so-called backwash, that is, the liquid is caused to flow through the interstices of the tube backwardly or in the direction opposite to that in which the liquid flowed during the filtering operation. An important feature of the invention is a filter tube to facilitate such removal of the layer R from the tube.

The invention contemplates filter tubes N of predetermined normal diameter and length having their ends opposite the flanges 7 closed as indicated at 7a, and having their side walls so constructed that the tubes will change in length and in diameter in response to changes in the pressure of the backwash liquid and thereby loosen the accumulated layer of diatomaceous earth or similar "filter aid" from the wall of the tube and cause the dislodged layer to fall away from the tube by gravity. More particularly, the invention contemplates a filter tube wherein portions of its side wall on which the layer of powder accumulates shall be capable of movement relative to other portions of said wall under the pressure of the backwash liquid so that the relative movement of said wall portions disengages the accumulated layer of "filter aid" from the tube, and the invention is especially directed to a filter tube formed of interlaced or braided wires that extend helically in the tube wall at angles to a diametral plane of the wall, i.e. a plane perpendicular to the axis of the tube, such that when there is a liquid pressure differential between the inside and the outside of the tube, the wall of the tube either will be elongated and decreased in diameter or shortened and increased in diameter, depending upon the angular relation of the wires to said diametral plane and whether the higher pressure is on the inside or the outside of the tube.

While the construction of the tube wall may be varied, one preferred form comprises wires woven in generally known manner with a so-called "basket" weave in which a plurality of groups of wires 0, each group including a plurality of wires 22, for example twelve, of small diameter, for example .008 inch, are braided with the wires running helically of the tube wall and with the groups of wires braided in the so-called "plain" or "over two-under two weave," which is frequently used in making tubular braids such as are applied to wires or hose. For convenience in manufacture, the wires may be initially braided on known machines so that the angle of the wires of each group of wires with said diametral plane of the tube is about 35°16′ so as to balance the end and side wall pressures and produce a stable construction which will neither swell nor elongate under pressure. This angle is sometimes called the "neutrality" angle. While the diameter of the tube may vary, a desirable tube is initially formed with a diameter of about 1¼ inches, and the tube is then drawn through a die to reduce its diameter to about 7⁄16 inches and at the same time rearrange the wires in the tube wall to such an angle to said diametral plane that the diameter and length of the tube will change under variations in pressure on the walls of the tube. As shown in FIGURE 7, the wires may be disposed at an angle of more than 35°16′ to a diametral plane P of the tube. With such a tube installed in a filter as above described and as shown in FIGURE 3, the length of the tube will be increased and the diameter will be decreased under a pressure differential of the liquid on the tube wall with the higher pressure outside of the tube as shown in FIGURE 8. The elongation and diminution in diameter of the tube should be limited, for example by a helical spring 24 or a rigid perforated cylinder loosely disposed within the tube as shown in FIGURE 5, with its peripheral surface normally spaced from but abuttable by the tube wall so as to prevent total collapse of the tube. The wires and their weave are such that upon release of the tube wall from the pressure differential, the wall will automatically return or spring back to its original and normal condition shown in FIGURE 7. It will be understood that the extent of the variations in diameter and length are exaggerated in the drawings for clearness in illustration.

FIGURE 9 schematically illustrates the same tube subjected to a pressure differential wherein the higher pressure is inside the tube, and the length of the tube between its ends is decreased while its diameter intermediate its ends is increased, but only to the extent that the wires approach the "neutrality" angle at which point the movement of the wires ceases.

The tubes made in such a way that the helix angle is less than 35°16′ with respect to said diametral plane will be decreased in length and increased in diameter when subjected to pressure differentials wherein the higher pressure is on the outside of the tube; and when the pressure differential is reversed, the tube will revert to its original length and diameter, but only to the point where the wires approach the "neutrality" angle.

It will be readily understood that the wires 22 may be formed of suitable material that will be chemically inert to the liquids and "filter aids" with which the filter tubes are used. For example, the wires may be galvanized steel or stainless steel, copper and its alloys, Monel or aluminum, depending upon the purpose for which the tube is to be used, and preferably the tubes are flexible and bendable. It will also be understood that the relative movement of the wires and the expansion and contraction of the tubes with something like a squirming action will effectively disengage the diatomaceous earth layer from the tubes, the relative movement of the adjacent wires also serving to change the size and shape of the interstices between the wires in such a way as to squeeze or push the diatomaceous earth outwardly from the interstices. The dislodgment of the layer of diatomaceous earth from the tube is schematically illustrated in FIGURE 5 where the tube and the layer in normal condition are shown in solid lines and the expansion of the tube is shown by dot-and-dash lines N' and particles of the layer of diatomaceous earth are illustrated as small dotted line circles falling away from the expanded wall of the tube and designated R'.

The dislodgment of the accumulated layer of "filter aid" from the tubes may be further facilitated by movement of the tubes in the liquid; especially in the present instance by oscillation of the lever 16 to cause up-and-down movement of the tube sheet and the filter tubes depending therefrom as best shown in FIGURE 3, such motion causing frictional contact between the accumulated layers of "filter aid" and the liquid in the tank, and also causing swaying and shaking of the tubes. The spring 13 absorbs the shock of the return of the tube sheet to the seat lugs 4 on the seat tube 1. At this point, it might be explained that the seat tube 1 could be omitted and the lugs or other supports for the tube sheet could be mounted directly on the inner surface of the side wall A of the tank.

While it forms no part of the invention, a cooling coil S ordinarily would be used in the tank above the tube sheet for circulation of cool liquid therethrough to cool the filtrate liquid or vapor before it leaves the tank through the outlet H.

While I have shown and described the now preferred embodiment of the invention, it will be understood that this primarily is for the purpose of illustrating the principles of the invention and that many modifications and changes can be made in the details of construction of the filter and filter tube within the spirit and scope of the invention. To avoid circumlocution the word "wire" as used in the claims is intended to include a non-elastic but flexible thin rod or wire-like strand of material that is chemically inert to the liquids to be filtered and to the filter aid powders.

I claim:

1. A pressure filter comprising a tank having a chamber for the liquid to be filtered, an inlet for supplying to said chamber under pressure a mixture of said liquid and solid particles in suspension, an outlet for the filtrate from said chamber, and a filter unit mounted in said chamber including at least one filter tube having a wall approximately circular in transverse cross-section with a predetermined normal diameter comprising a plurality of interlaced helically disposed non-stretchable and non-contractible but flexible wires providing between them filtering pores through which said liquid must flow from said inlet to one side of said wall to said outlet at the other side of said wall upon production of a pressure differential in the liquid at opposite sides of said wall and during said flow deposit solid particles in said pores and in a layer on the tube wall, certain of said wires running helically of the tube side by side in one direction and other wires running helically of the tube side by side in another direction with the helices disposed at angles to a plane perpendicular to the axis of the tube other than the neutrality angle, the first-mentioned wires crossing and extending under some and over others of the second-mentioned wires, whereby said wires are movable relatively to each other both longitudinally and perimetrally of the tube to expand and contract the tube wall in diameter and length and at the same time maintain said wall of the same cross-sectional shape in response to variations in said pressure differential and thereby dislodge said layer of solid particles from said pores and said wall, and a member loosely mounted within said tube whose peripheral surface is normally spaced from but is abutted by said wall and thereby limits inward movement or compressibility of the wall under said pressure differential and has passages for flow of liquid through the tube, at least one end of the tube wall being open and there being means mounting said tube in the tank for free flow of the liquid through said open end to and from said outlet and the other end of the tube being formed to provide for the establishment of a pressure differential at opposite sides of the tube wall upon flow of liquid under pressure from one side of the wall to the other, said wires and their helical relation to each other and said member providing for automatic return of the tube to its original condition upon release of the tube wall from said pressure differential.

2. For use in a pressure filter, a filter unit comprising a tube whose wall is circular in cross-section with a predetermined normal diameter and includes a plurality of interlaced helically disposed non-stretchable and non-contractible but flexible wires providing between them filtering pores through which the liquid of a mixture of a liquid and solid particles in suspension flows during operation of the filter from one side of the wall to the other and on one side of which the solid particles accumulate in a layer during said flow, certain of said wires running helically of the tube side by side in one direction and other wires running helically of the tube side by side in another direction with the helices disposed at angles to a plane perpendicular to the axis of the tube other than the neutrality angle, the first-mentioned wires crossing and extending under some and over others of the second-mentioned wires, whereby said wires are movable relatively to each other both longitudinally and perimetrally of the tube to expand and contract the tube wall in diameter and length and at the same time maintain said wall of the same cross-sectional shape in response to variations in a pressure differential in the liquid on opposite sides of said wall and thereby dislodge said layer of solids from said wall, and a member loosely mounted within said tube whose peripheral surface is normally spaced from but is abutted by said wall under said pressure differential and thereby limits inward movement or compressibility of the wall, said member having passages for said flow of liquid through the tube, said wires and their relation to each other and said member providing for automatic return of the tube to its original condition upon release of the tube wall from said pressure differential.

3. A pressure filter as defined in claim 1 wherein there are a plurality of groups of wires with wires of each group interlaced with wires of other groups and extending under some groups and over other groups, and the wires of each group are parallel to each other in side-by-side relation and parallel to the wires of some groups and crossing the wires of the other groups.

4. For use in a pressure filter, a filter unit as defined in claim 2 wherein there are a plurality of groups of wires with the wires of each group interlaced with the wires of other groups and extending under some groups and over some groups, and the wires of each group are parallel to each other in side-by-side relation and parallel to the wires of some groups and crossing the wires of other groups.

5. A pressure filter as defined in claim 1 wherein said member comprises an helical spring arranged in the tube, and said spring has an external diameter less than the normal internal diameter of the tube and is of a length approximately equal to the length of the tube.

6. For use in a pressure filter, a filter unit as defined in claim 2 wherein said member comprises an helical spring arranged in the tube, and said spring has an external diameter less than the normal internal diameter of the tube and is of a length approximately equal to the length of the tube.

7. For use in a pressure filter, a filter unit as defined in claim 2 wherein said tube is open and flanged at one end for connection to a tube sheet and closed at the other end, and said member is arranged in the tube with one end loosely abutting the closed end of the tube and has an external diameter less than the normal internal diameter of the tube and a length approximately equal to the length of the tube.

References Cited in the file of this patent

UNITED STATES PATENTS

| | | |
|---|---|---|
| 2,035,758 | Pierce | Mar. 31, 1936 |
| 2,460,084 | Hebo | Jan. 25, 1949 |
| 2,654,482 | Robinson et al. | Oct. 6, 1953 |
| 2,862,622 | Kircher et al. | Dec. 2, 1958 |

FOREIGN PATENTS

| | | |
|---|---|---|
| 213,162 | Australia | Feb. 19, 1958 |
| 314,907 | Switzerland | Aug. 31, 1956 |